US008365410B2

(12) United States Patent
Doroghazi et al.

(10) Patent No.: US 8,365,410 B2
(45) Date of Patent: Feb. 5, 2013

(54) GRILLE BADGE AND/OR METHOD OF MAKING THE SAME

(75) Inventors: William J. Doroghazi, Livonia, MI (US); Greg F. Hintzke, Macomb Township, MI (US); Thomas J. Fenbert, Maybee, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 137 days.

(21) Appl. No.: 13/064,348

(22) Filed: Mar. 21, 2011

(65) Prior Publication Data

US 2011/0171402 A1 Jul. 14, 2011

Related U.S. Application Data

(62) Division of application No. 11/987,666, filed on Dec. 3, 2007, now Pat. No. 7,921,563.

(51) Int. Cl.
*B23P 15/12* (2006.01)
(52) U.S. Cl. ......... 29/897.15; 29/428; 29/557; 29/558; 40/591; 40/643; 296/193.1; 428/31; 428/542.2
(58) Field of Classification Search ............ 29/428, 29/557, 558, 897.15; 40/591, 643; 296/193.1; 428/31, 542.2
See application file for complete search history.

(56) References Cited

U.S. PATENT DOCUMENTS

| 6,422,643 B1 | 7/2002 | Pease |
| 6,861,105 B2 | 3/2005 | Veerasamy |
| D505,898 S | 6/2005 | Marchese et al. |
| D518,428 S | 4/2006 | Marchese et al. |

OTHER PUBLICATIONS

U.S. Appl. No. 11/987,666, filed Dec. 3, 2007; Doroghazi et al.

*Primary Examiner* — Richard Chang
(74) *Attorney, Agent, or Firm* — Harness, Dickey & Pierce, PLC (57) ABSTRACT

Certain example embodiments of this invention relate to a grille badge including an outer member and an inner member configured to be snapped together. The inner member includes a living hinge to facilitate the connection to the outer member. The inner member is at least initially inserted into the outer member in a bent position, the inner member being bent or snapped into place via the living hinge provided thereto during manufacturing and/or assembly. In certain example embodiments, the outer element includes at least one slot for receiving at least one corresponding tab provided to the inner element. In certain example embodiments, the inner and outer members include corresponding snap features for securing the connection therebetween. An assembled grille badge may be connected, directly or indirectly, to a vehicle (e.g., to the vehicle, to a front-end assembly, to a grille, etc.), for example, using one or more snap features.

8 Claims, 6 Drawing Sheets

GRILLE BADGE AND/OR METHOD OF MAKING THE SAME

This application is a divisional of application Ser. No. 11/987,666 filed Dec. 3, 2007 now U.S. Pat. No. 7,921,563, the entire disclosure of which is hereby incorporated herein by reference in this application.

FIELD OF THE INVENTION

Certain example embodiments of this invention relate to grille badges for vehicles and/or methods of making the same. More particularly, certain example embodiments described herein relate to a grille badge (e.g., to be provided at the front end of a vehicle such as a car, pickup truck, or SUV) comprising an outer member and an inner member configured to be snapped together, the inner member including a living hinge to facilitate the connection therebetween. In certain example embodiments, the grille badge is at least initially assembled out of position with respect to the inner and outer members, the inner member being bent or snapped into place via the living hinge. In certain example embodiments, the outer element includes at least one slot for receiving at least one corresponding tab provided to the inner element and/or the inner and outer members include corresponding snap features for securing the connection therebetween.

BACKGROUND AND SUMMARY OF EXAMPLE EMBODIMENTS OF THE INVENTION

Grille badges typically are decorative elements located to the front ends of vehicles (e.g., cars, trucks, busses, and the like). They often are connected to, or formed as a part of, a vehicle's grille. Grille badges have been made from metal, plastic, and other materials.

Some design approaches for manufacturing grille badges have involved producing more than one member that are then assembled. This approach results reduces the manufacturing time required with respect to creating the individual members to be assembled and also sometimes reduces the amount of waste caused by fashioning the grille badge from a single member.

Although the approach of assembling grille badges from two or more members has represented an improvement in terms of design manufacturing, further improvements are still possible. Currently, when multiple members are provided for a single grille badge, the separate elements have to be connected in some way. One way that the multiple members are connected involves taping and/or heat-staking processes. Unfortunately, these techniques require physical labor for assembly, and the security of the connection between the two members often is a concern. Indeed, when tapes or other adhesives are used, the members may separate and/or even fall apart.

Another approach to assembling the separate elements involves providing a series of interlocking features between the several members. However, the somewhat rigid elements that are to comprise the grille badge generally have to be bent and/or torqued into place. Thus, mechanical stresses are introduced to the product. This requires additional manual labor and time during assembly, and often produces waste caused by one or more of the individual pieces being broken or bent into an unusable form.

A modestly successful vehicle may sell approximately 650,000 units. As such, the time and money considerations associated with the manufacturing and assembly of such grille badges are non-trivial.

Thus, it will be appreciated that there is a need in the art for an improved grille badge and/or methods of making the same.

In certain example embodiments of this invention, a method of making a grille badge for a vehicle is provided. An outer member including at least two channels formed therein and at least two outer member snap features formed thereon is provided. An inner member including a living hinge extending horizontally or vertically across the inner member is provided. At least two tabs and at least two inner member snap features are formed on the inner member. Each tab of the inner member is inserted into each respective channel of the outer member such that the inner member is out of position with respect to the outer member at the living hinge thereof. A force is applied to the inner member proximate to the living hinge so as to bend the inner member into position with respect to the outer member and further to engage corresponding snap features of the inner and outer members. The plurality of snap features formed on the inner member and/or the outer member and/or the tabs and channels are arranged so as to provide a secure connection between the inner member and the outer member, free from secondary fasteners therebetween.

In certain example embodiments of this invention, there is provided a method of making a grille badge for a vehicle, the method comprising: providing an outer member including at least two channels formed therein and at least two outer member snap features formed thereon; providing a polymer-based inner member including a living hinge extending across at least part of the inner member; providing on the inner member at least two tabs and at least two inner member snap features; inserting the tabs of the inner member into the respective channels of the outer member such that the inner member is bent about the living hinge so that the living hinge of the inner member is spaced apart from and thus out of position with respect to the outer member; applying force to the inner member in order to bend the inner member about the living hinge into position with respect to the outer member, the living hinge being located adjacent the outer member after application of said force, and wherein said force further causes the snap features of the inner and outer members to engage with each other; and wherein the snap features of the inner member and/or the outer member, and the tabs and channels, provide a substantially secure connection between the inner member and the outer member.

In certain example embodiments, a method of making a grille badge for a vehicle is provided. An outer member is injection molded so as to include two upper channels, two lower channels, and two outer member snap features. An inner member is injection molded so as to include at two upper tabs, two lower tabs, and two inner member snap features. A living hinge is formed from the inner member such that the living hinge extends horizontally or vertically across the inner member. Each upper tab of the inner member is inserted into each respective upper channel of the outer member, and each lower tab of the inner member is inserted into each respective lower channel of the outer member, so that the inner member is out of position with respect to the outer member at least at the living hinge thereof. The inner member is bent proximate to the living hinge to force the inner member into position with respect to the outer member and further to engage corresponding snap features of the inner and outer members.

In certain example embodiments, a grille badge for a vehicle is provided. An outer member includes at least two channels formed therein and at least two outer member snap features formed thereon. An inner member includes a living hinge extending horizontally or vertically across the inner member, at least two tabs, and at least two inner member snap features. Each tab of the inner member is insertable into a respective channel of the outer member so that the inner member is at least initially out of position with respect to the outer member at the living hinge thereof. The inner member is bendable at the living hinge thereof so as to bend into position with respect to the outer member and to engage corresponding snap features of the inner and outer members in response to a force applied to the inner member proximate to the living hinge thereof. The plurality of snap features of the inner member and/or the outer member, and/or the tabs and channels are arranged so as to provide a secure connection between the inner member and the outer member free from secondary fasteners therebetween.

In certain example embodiments, a grille badge for a vehicle is provided. An injection molded plastic outer member includes two upper channels and two lower channels formed therein, and at least two outer member snap features formed thereon. An injection molded plastic inner member includes a living hinge extending horizontally or vertically across the inner member, two upper tabs, two lower tabs, and at least two inner member snap features. Each upper tab of the inner member is insertable into a respective upper channel of the outer member and each lower tab of the inner member is insertable into a respective lower channel of the outer member so that the inner member is at least initially out of position with respect to the outer member at the living hinge thereof. The inner member is bendable at the living hinge thereof so as to bend into position with respect to the outer member and to engage corresponding snap features of the inner and outer members in response to a force applied to the inner member proximate to the living hinge thereof.

In certain example embodiments, a vehicle comprising a grille including a grille badge is provided. The grille badge comprises an outer member including at least two channels formed therein and at least two outer member snap features formed thereon; and an inner member including a living hinge extending horizontally or vertically across the inner member, at least two tabs, and at least two inner member snap features. Each tab of the inner member is insertable into a respective channel of the outer member so that the inner member is at least initially out of position with respect to the outer member at the living hinge thereof. The inner member is bendable at the living hinge thereof so as to bend into position with respect to the outer member and to engage corresponding snap features of the inner and outer members in response to a force applied to the inner member proximate to the living hinge thereof. The plurality of snap features of the inner member and/or the outer member, and/or the tabs and channels are arranged so as to provide a secure connection between the inner member and the outer member free from secondary fasteners therebetween.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to a grille badge comprising an outer member and an inner member configured to be snapped together. The inner member includes a living hinge to facilitate the connection to the outer member. The grille badge is at least initially manufactured and/or assembled out of position with respect to the inner and outer members (e.g., the inner member is at least initially inserted into the outer member in a bent position), the inner member being bent or snapped into place via the living hinge provided thereto during manufacturing and/or assembly. In certain example embodiments, the outer element includes at least one slot for receiving at least one corresponding tab provided to the inner element. In certain example embodiments, the inner and outer members include corresponding snap features for securing the connection therebetween. The inner and outer members may be formed from an injection molded plastic. Ultimately, an assembled grille badge may be connected, directly or indirectly, to a vehicle (e.g., to the vehicle, to a front-end assembly, to a grille, etc.), for example, using one or more snap features.

The example embodiments described herein involve a design-for-manufacturing and a design-for-assembly (DFM/DFA) approach. Thus, the example embodiments advantageously provide improved techniques for manufacturing and/or assembling grille badges. In certain non-limiting implementations, it has been found that grille badges have been manufactured, assembled, and installed to vehicles at a rate of about 3.5-4 badges per minute. Thus, certain example embodiments reduce losses in material, result in labor savings, and/or provide a more robust and simplified design for grille badges.

Figure 1A:
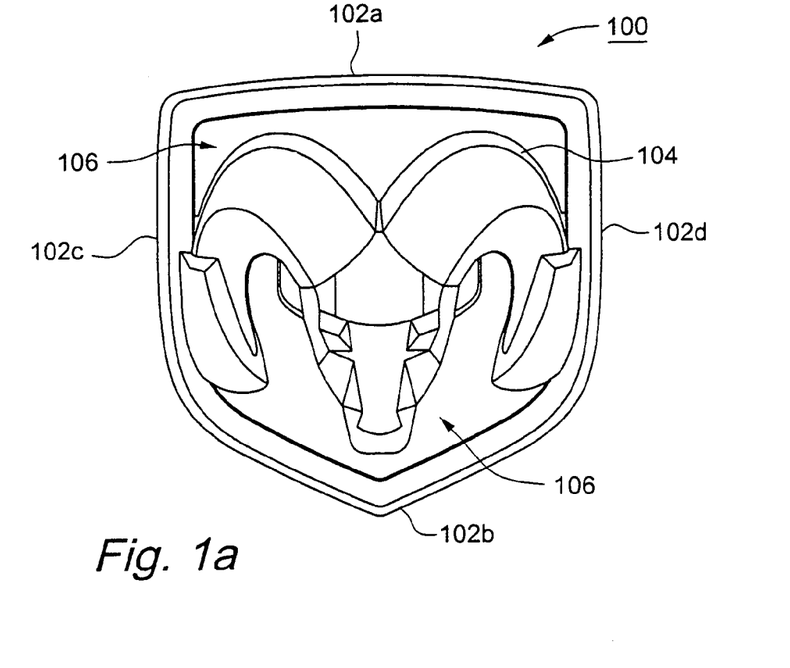
FIG. 1a is a front view of an illustrative outer member in accordance with an example embodiment.

Referring now more particularly to the drawings, FIG. 1a is a front view of an illustrative outer member 100 in accordance with an example embodiment. The outer member 100 is at least partially defined by upper, lower, and side portions of a frame 102a/102b/102c/102d. In the example shown in FIGS. 1a and 1b, the frame 102 is shaped like a shield, although it will be appreciated that any suitable shape (e.g., a substantially circular, rectangular, square, ovular, or other shape) could be used. A decorative logo 104 (in this case, a stylized ram) is formed within (e.g., in the center of) the frame 100. The logo 104 may be flush with, and/or raised and/or recessed from the frame 102. There are one or more holes 106 left inside the frame 102 (e.g., the logo 104 does not fully occupy the interior of the frame 102). This arrangement may be used in connection with certain example embodiments, e.g., to provide contrasting looks to the assembled grille badge (for example, by providing the outer member 100 in one or more styles or colors, and by providing the inner member in one or more styles or colors that may be the same as or different from those of the outer member 100).

Figure 1B:
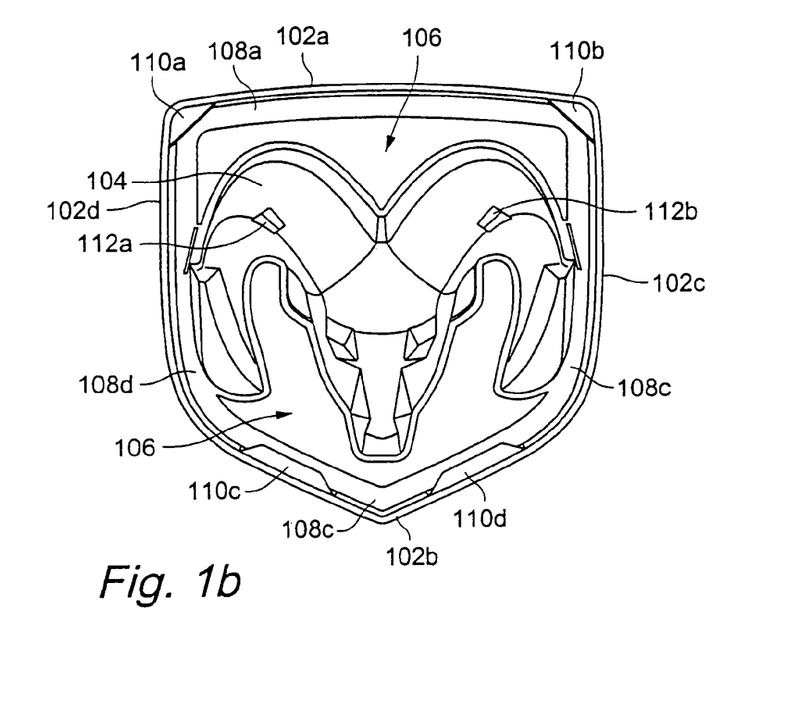
FIG. 1b is a back view of an illustrative outer member in accordance with an example embodiment.

FIG. 1b is a back view of an illustrative outer member 100 in accordance with an example embodiment. The frame 102 is shown as having a lip 108 that extends all the way around the frame 102. The lip 108 may be at least partially raised with respect to the flat portions of the frame 102. Portions of the frame 102 and/or the lip 108 may be extruded inwardly (e.g., towards the center of the outer member 100) so as to help form gaps or channels 110a-d so that a plurality of corresponding tabs from the inner member may be inserted therein, as will be described in greater detail below. Thus, in certain example embodiments, a plurality of channels 110 may be provided at least partially around the periphery of the outer member 100 for receiving respective tabs from the inner member. It will be appreciated that any number of channels 110 may be used in connection with certain example embodiments, and that the location(s) may be varied. Generally, the channels 110 will be provided in close relative proximity to the frame 102 and the lip 108 so as to more easily define the respective recessions. In certain example embodiments, the channels 110 may be provided roughly at the "corners" of the outer member 100 so as to provide increased stability when holding the inner member.

One or more snap features 112a-b also are provided to the inner surface of the outer member 100. In certain example embodiments, the one or more snap features 112a-b may be protrusions having barbs on the end, with the protrusions being biased such that they bend somewhat to engage with a corresponding snap feature of the inner member and then snap back into place to form a more secure connection. In certain example embodiments, such a biased protrusion with a barb on the end may be provided instead or in addition to the inner member, and/or in certain example embodiments the snap features 112a-b provided to the outer member may be more rigidly fixed in position such that they do not bend when a corresponding snap feature from the inner member is connected thereto.

Figure 2A:
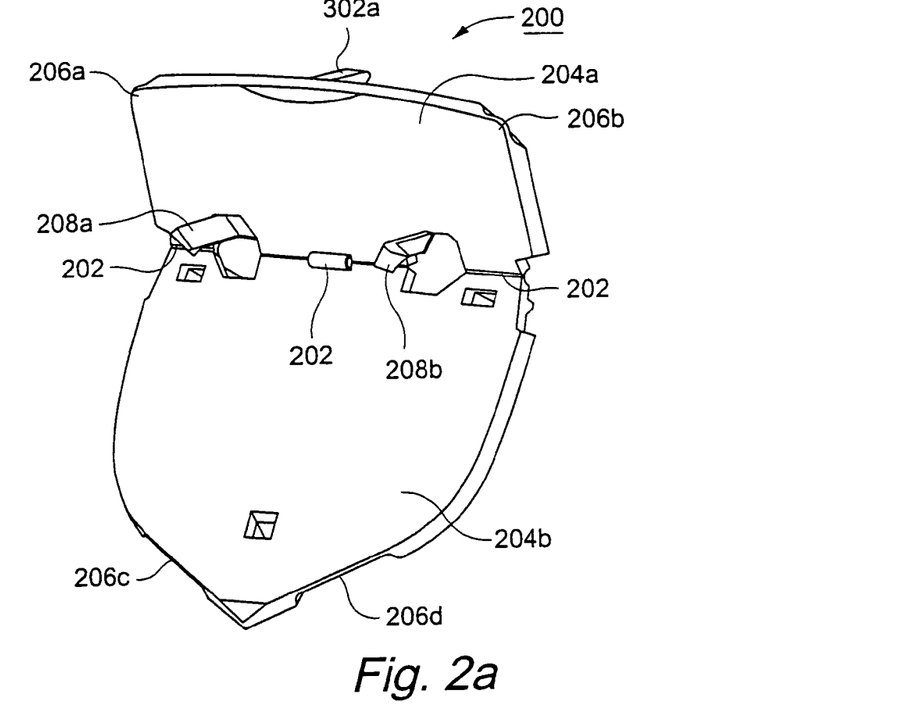
FIG. 2a is a partial perspective view of an illustrative bent inner member showing the side of the inner member that engages with the outer member, in accordance with an example embodiment.
Figure 2B:
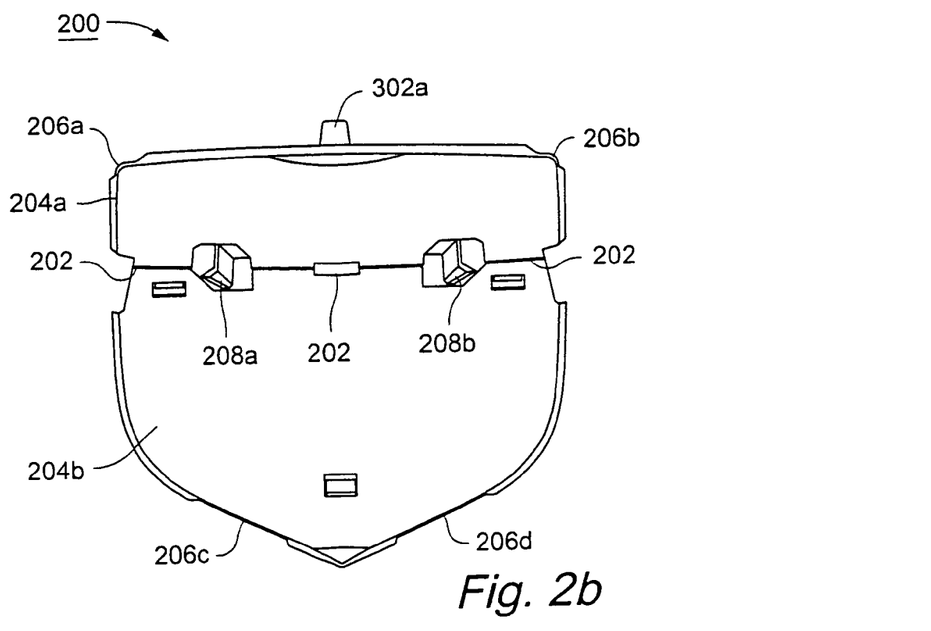
FIG. 2b is a view of an illustrative inner member showing the side of the inner member that engages with the outer member, in accordance with an example embodiment.

FIG. 2a is a partial perspective view of an illustrative bent inner member 200 showing the side of the inner member 200 that engages with the outer member 100, in accordance with an example embodiment, and FIG. 2b is a view of an illustrative inner member 200 showing the side of the inner member 200 that engages with the outer member 100, in accordance with an example embodiment. The inner member 200 includes a living hinge 202. That is, a hinge 202 is formed from, or as a part of, the member itself, rather than requiring any additional conventional hinge-like components. Thus, the top portion 204a of the inner member 200 and the bottom portion 204b of the inner member 200 may rotate about the living hinge 202. The position and/or orientation of the living hinge 202 may be varied depending on the design of the grille badge. In FIGS. 2a and 2b, the living hinge 202 is shown slightly above center in a substantially horizontal orientation. This position is advantageous because the decorative logo 104 will obstruct any small gaps or voids on the other side of the living hinge 202 and/or improve the aesthetic appearance of the assembled grille badge. Also, the orientation of the living hinge 202 is substantially horizontal to aid with assembly, because the channels 110a-d are located roughly at the top and bottom of the outer member 100. The living hinge 202 may extend substantially fully across the width of the inner member 200 (e.g., may extend between the left and right sides thereof) and/or may be interrupted with one or more gaps formed in the inner member 200. Such gaps may be useful for accessing the snap features and/or during connection, disconnection, reconnection, etc.

A plurality of tabs 206a-d are formed around the periphery of the inner member. The tabs 206a-d are disposed so as to correspondingly engage with channels 110a-d. In certain example embodiments, the tabs 206a-d may be recessed with respect to the outer edge of the inner member 200 so as to reduce the profile thereof and/or provide a tighter connection between the inner member 200 and the outer member 100. A plurality of snap features 208a-b extend inwardly from the inner member 200 so as to engage with the snap features 112a-b of the outer member 100. It will be appreciated that just as the snap features 112a-b of the outer member 100 may be varied in size, position, and functionality, so too may the same and/or other characteristics of the snap features 208a-b of the inner member 200 be varied. In the example implementation shown and described with respect to FIGS. 1a, 1b, 2a, and 2b, the snap features 208a-b are more capable of receiving a bias for snapping into place than the more rigid snap features 112a-b, and the snap features 208a-b are shown as being protrusions with barbs on the ends whereas the snap features 112a-b have shorter (or even no) protrusions relative to the logo 104, although the present invention is not limited to this arrangement.

Figure 3A:
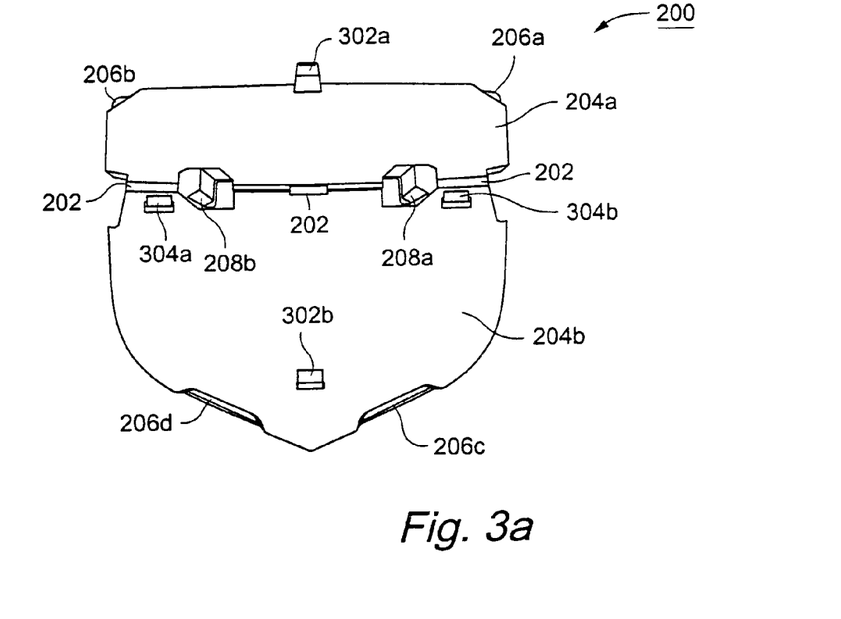
FIG. 3a is a view of an illustrative inner member showing the side of the inner member that faces away from the outer member, in accordance with an example embodiment.
Figure 3B:
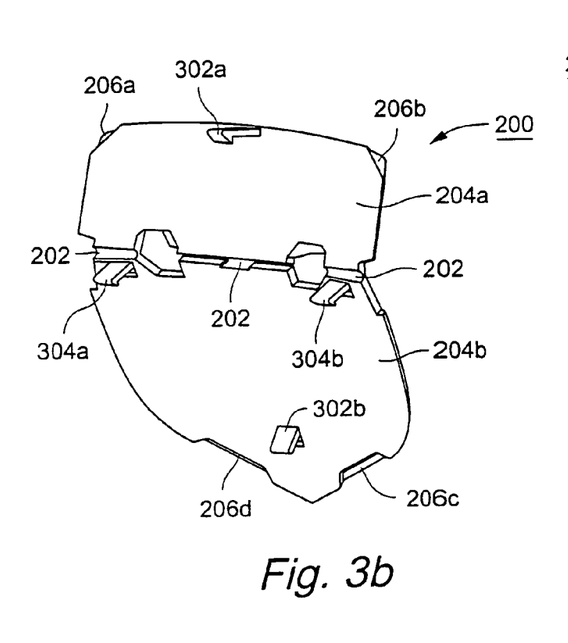
FIG. 3b is a partial perspective view of an illustrative bent inner member showing the side of the inner member that faces away from the outer member, in accordance with an example embodiment.
Figure 3C:
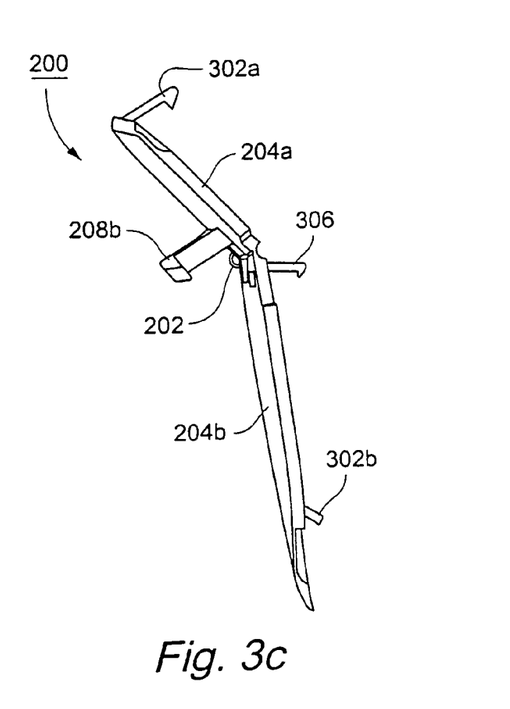
FIG. 3c is a side view of an illustrative bent inner member in accordance with an example embodiment.

FIGS. 3a-c show the side of the inner member 200 that faces away from the outer member 100 (e.g., the side that connects, directly or indirectly, with the vehicle). More particularly, FIG. 3a is a view of an illustrative inner member 200 showing the side of the inner member 200 that faces away from the outer member 100, in accordance with an example embodiment, FIG. 3b is a partial perspective view of an illustrative bent inner member 200 showing the side of the inner member 200 that faces away from the outer member 100, in accordance with an example embodiment, and FIG. 3c is a side view of an illustrative bent inner member 200 in accordance with an example embodiment. As will be appreciated from FIGS. 3a-b, the tabs 206a-d may not be flush with the surface of the inner member 200 so as to more easily fit into the channels 110a-d of the outer member 200.

In addition to some of the components shown and described in relation to FIGS. 2a-b, FIGS. 3a-c show certain example features that aid in the connection between the grille badge and the vehicle. It will be appreciated that the connection between the grille badge and the vehicle may be direct or indirect. That is, the grille badge may be provided to a grille, a front-end assembly, the frame of the vehicle, etc., for example, via snap features. These snap features may include, for example, upper and lower snap features 302a-b, left and right snap features 304a-b, and/or center locator and/or snap feature 306. These snap features may be provided in any combination and/or arrangement with respect to the inner member 200 and are not limited to the arrangements shown in FIGS. 3a-c. Each of the snap features 302a-b/304a-b/306 may include protrusions with barbs on the end that may be capable of receiving a bias and snapping back into place when being connected to the vehicle. The optional center locator 306 may be a snap feature and/or may simply be a large hook-like member to aid in the positioning of the assembled grille badge with respect to the vehicle.

Figure 4A:
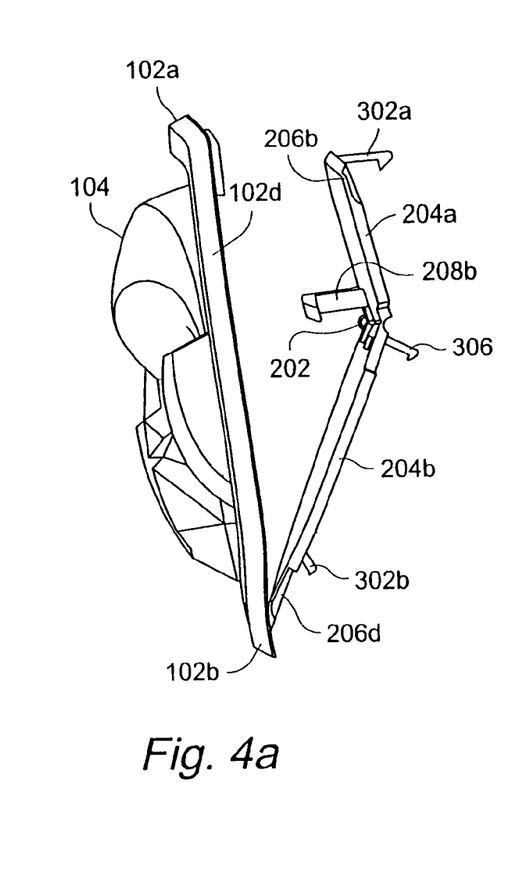
FIG. 4a is a side view of an illustrative inner member being inserted into an outer member in accordance with an example embodiment.
Figure 4B:
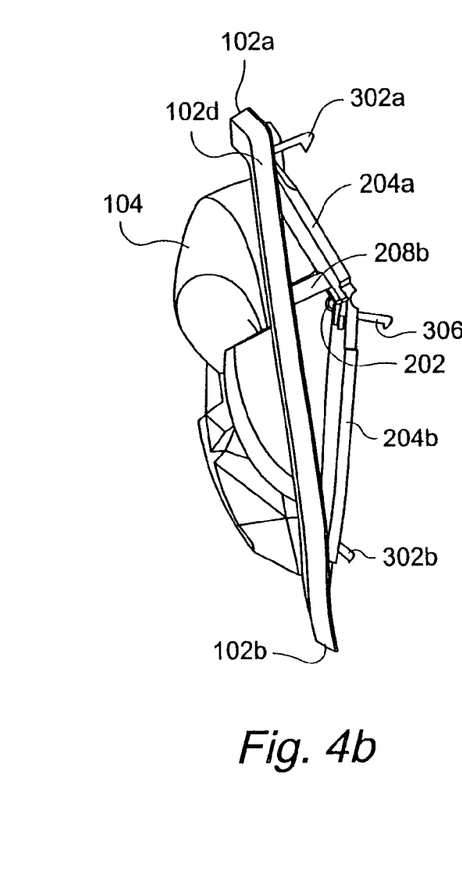
FIG. 4b is a side view of an illustrative inner member inserted into an outer member, out of position, in accordance with an example embodiment.
Figure 4C:
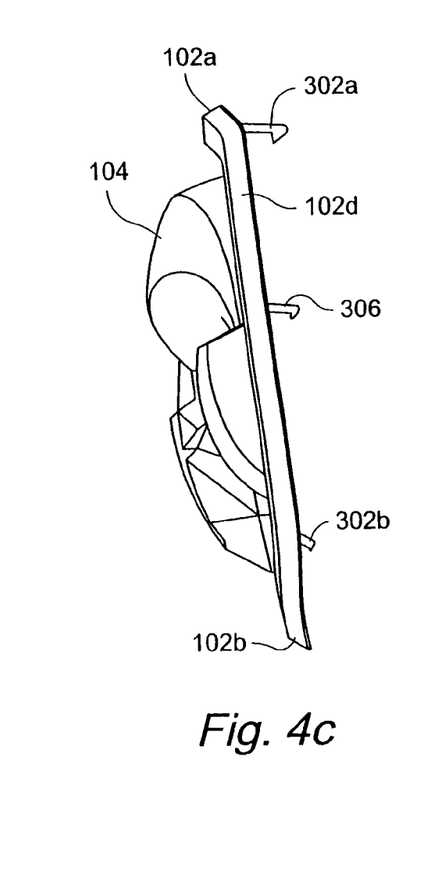
FIG. 4c is a side view of the assembled inner and outer members, in accordance with an example embodiment.

FIGS. 4a-c help demonstrate how the outer member 100 and the inner member 200 are connected. More particularly, FIG. 4a is a side view of an illustrative inner member 200 being inserted into an outer member 100 in accordance with an example embodiment, FIG. 4b is a side view of an illustrative inner member 200 inserted into an outer member 100, out of position, in accordance with an example embodiment, and FIG. 4c is a side view of the assembled inner and outer members 200, 100, in accordance with an example embodiment.

In FIG. 4a, the lower tabs 206c-d of the inner member 200 are inserted into the lower channels 110c-d of the outer member 100. Upon insertion of the lower tabs 206c-d into the lower channels 110c-d, the inner member 200 may or may not be out of position. That is, the inner member 200 may or may not be bent along the living hinge 202.

In FIG. 4b the upper tabs 206a-b of the inner member 200 are inserted into the upper channels 110a-b of the outer member 200. At this point, the inner member 200 is out of position (e.g., bent along the living hinge 202), so as to facilitate the connection between the inner member 200 and the outer member 100. To complete the assembly, pressure is applied to the inner member 200, e.g., proximate to the living hinge 202 so as to cause the top portion 204a to move upward and/or the lower portion 204b to move downward, engaging the respective snap features of the inner and outer members 200, 100, and to insert the tabs 206 into the respective channels 110 fully (e.g., until they are in their final position) and engage the respective snap features.

It will be appreciated that although FIGS. 4a-c show the lower tabs 206c-d being inserted into the lower channels 110c-d first, the present invention is not so limited. For example, the upper tabs 206a-b may be inserted into the upper channels 110a-b before the lower tabs 206c-d are inserted into the lower channels 110c-d in certain example embodiments. In certain example embodiments, where there is a substantially vertical living hinge, left-side tabs may be inserted before right-side tabs, or vice versa, when such arrangements are implemented.

Figure 5A:
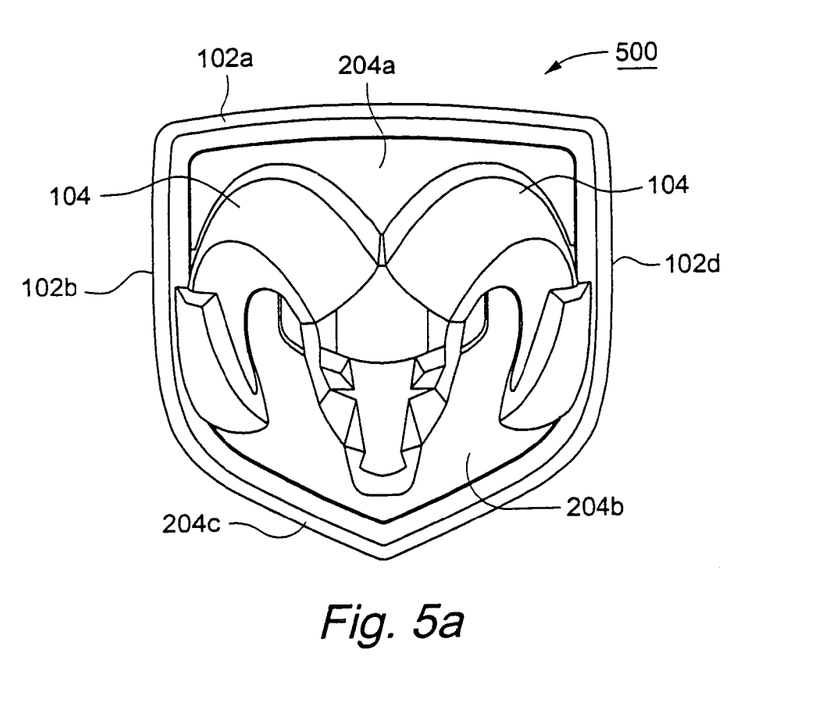
FIG. 5a is a front view of the assembled grille badge, in accordance with an example embodiment.
Figure 5B:
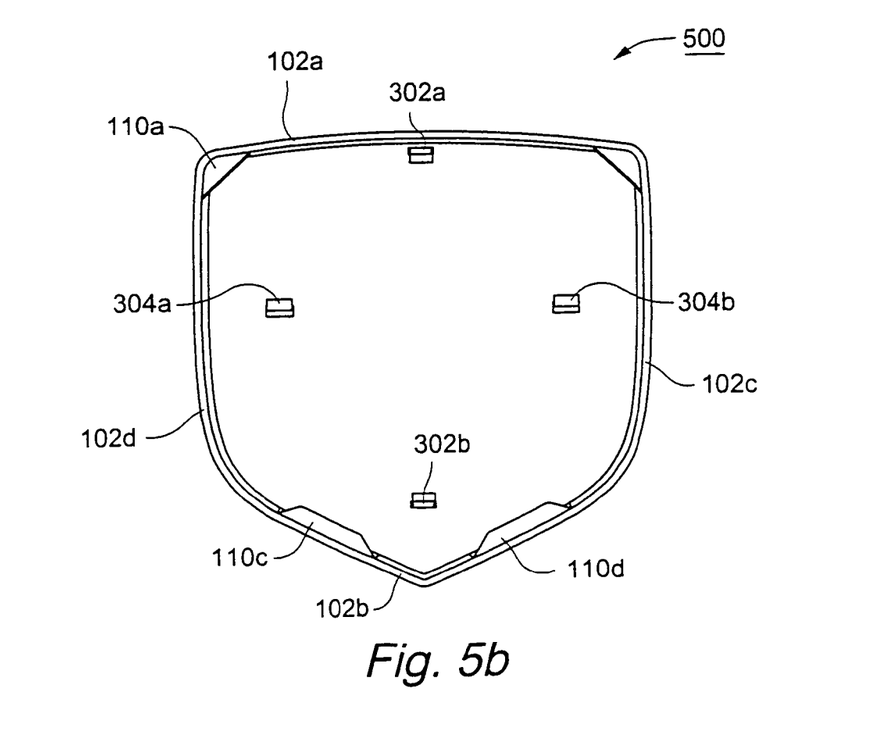
FIG. 5b is a back view of the assembled grille badge, in accordance with an example embodiment.

FIG. 5a is a front view of the assembled grille badge 500, in accordance with an example embodiment, and FIG. 5b is a back view of the assembled grille badge 500, in accordance with an example embodiment. As can be seen from FIG. 5a, the holes 106 are now "filled" via the inner member 200 so as to form a complete grille badge 500. The living hinge 202 is not visible from the front of the assembled grilled badge 500, e.g., because of the way it is manufactured and/or because it is at least partially obstructed by the logo 104. As can be seen from FIG. 5b, the tabs are 206a-d are fully and securely inserted into channels 110a-d. Also, the upper and lower snap features 302a-b and left and right snap features 304a-b are ready to connect the grille badge to the vehicle.

Figure 6A:
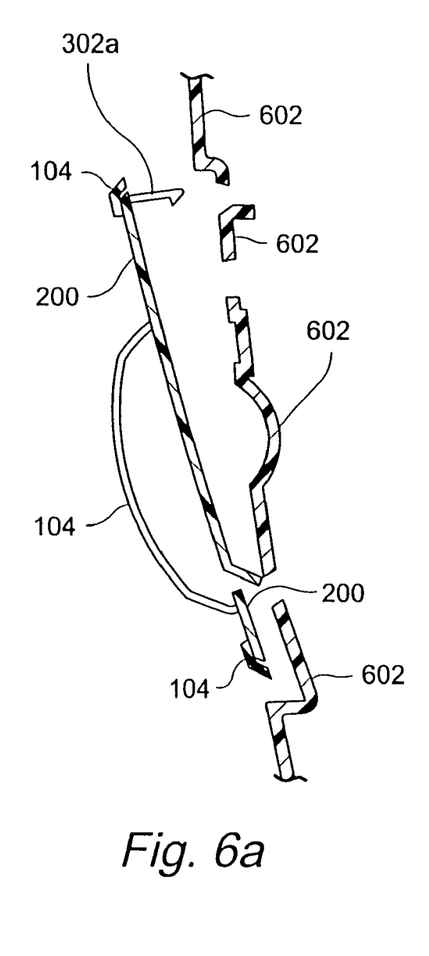
FIG. 6a-c are cross-sectional views showing an illustrative assembled grille badge being connected to a vehicle grille, in accordance with an example embodiment.
Figure 6B:
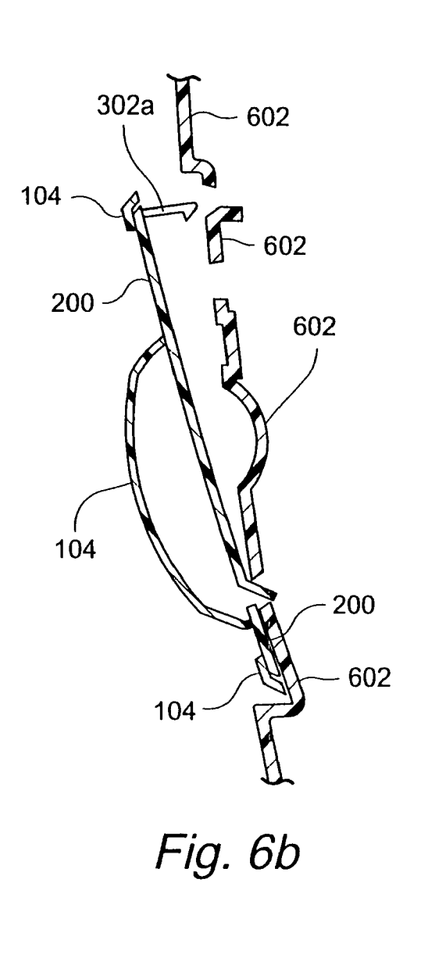
Figure 6C:
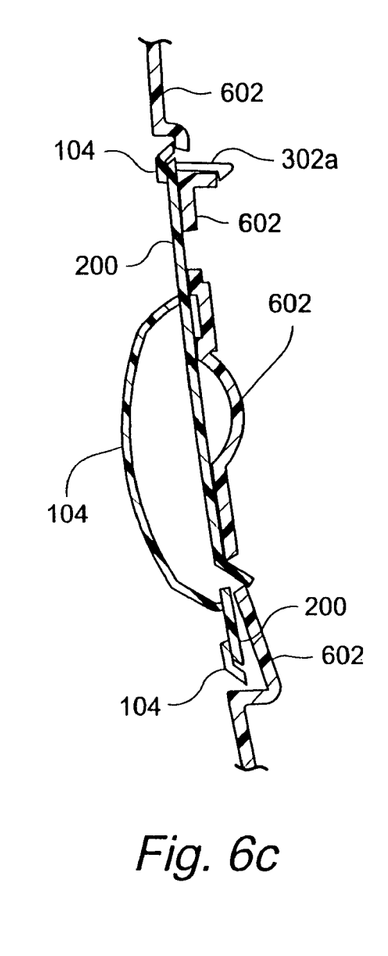

FIGS. 6a-c are cross-sectional views showing an illustrative assembled grille badge being connected to a vehicle grille 602, in accordance with an example embodiment. In FIG. 6a, the assembled grille badge is set into place proximate to where it will be connected to the grille 602. To this end, a lower portion of the assembled grille badge may be set in or on the grille 602. The grille badge is rocked towards the grille 602, as shown in FIG. 6b. Finally, the snap features engage with corresponding snap and/or receiving features of the grille, as is shown in FIG. 6c. Thus, for example, FIG. 6c shows the upper snap feature 302a engaging with the grille 602 so as to form a secure connection thereto.

It will be appreciated that the outer member 100 and the inner member 200 may be formed from any suitable material. For example, the outer member 100 and the inner member 200 may be injection molded plastic components. Indeed, injection molded plastic components are advantageous in that they allow the use of a living hinge and provide the requisite flexibility therefor. They also are easy to mold and tool or re-tool as called for by the particular design and/or implementation.

The assembly techniques described herein may be automated (e.g., performed by a machine) in whole or in part. For example, the insertion of tabs into channels, snapping of snap-in features into place, bending of the inner member that is initially manufactured out of place into place along the living hinge, and/or the connection of the grille badge to the vehicle (e.g., to a grille of a vehicle) may be accomplished by hand or by mechanized techniques.

In certain example embodiments, the plurality of snap features molded into the inner member and/or the outer member, and/or the respective tabs and channels may provide a secure connection between the inner member and the outer member. Thus, it may be possible in certain example embodiments to reduce (and sometimes even eliminate) the need for secondary fasteners that otherwise would be needed to connect the inner and outer members. Such secondary fasteners may include, for example, adhesives, tapes, clips, screws, and/or the like. Similarly, the snap features provided to the back of the inner member may reduce (and sometimes even eliminate) the need for secondary fasteners that otherwise would be needed to connect the grille badge to the vehicle.

It will be appreciated that although certain example embodiments have been described in relation to certain arrangements of tabs, channels, snap-in features, living hinges, and/or the like, the present invention is not so limited. Such component features may be positioned in accordance with the design ultimately implemented, which may be based in part on the ultimate aesthetic look of the grille badge, the aesthetic look, of course, also being variable in dependence on the particular needs of a consumer (e.g., vehicle manufacturer, end-consumer, etc.) and/or implementation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A grille badge for a vehicle, comprising:
an outer member including at least two channels formed therein and at least two outer member snap features formed thereon;
an inner member including a living hinge extending across at least part of the inner member, at least two tabs, and at least two inner member snap features;
wherein each tab of the inner member is insertable into a respective channel of the outer member;
wherein the inner member is bendable via the living hinge thereof so that the inner member can be bent into position with respect to the outer member and to engage corresponding snap features of the inner and outer members in response to a force applied to the inner member; and wherein the plurality of snap features of the inner member and/or the outer member, and/or the tabs and channels, are arranged so as to provide a secure connection between the inner member and the outer member free from secondary fasteners such as screws therebetween to form the grille badge to be mounted to a grill of the vehicle.

2. The grille badge of claim 1, wherein the inner and outer members are injection molded plastic components.

3. The grille badge of claim 1, further comprising at least one grille snap feature provided to the inner member on a side of the inner member opposite the inner member snap features,
wherein the at least one grille snap feature of the inner member is configured to facilitate a connection between the grille badge and a vehicle grille of the vehicle.

4. The grille badge of claim 1, wherein the living hinge extends approximately across a center line of the inner member.

5. The grille badge of claim 1, wherein the living hinge is at least partially concealed by the outer member when the inner member is connected to the outer member.

6. The grille badge of claim 1, wherein each said inner member snap feature comprises a protrusion with a barb on an end thereof, and wherein each said outer member snap feature includes at least a barb.

7. The grille badge of claim 1, wherein each said tab is recessed with respect to a rearward facing surface of the inner member.

8. A grille badge for a vehicle, comprising:
an injection molded plastic outer member including two upper channels and two lower channels formed therein, and at least two outer member snap features formed thereon;
an injection molded plastic inner member including a living hinge extending horizontally or vertically across the inner member, two upper tabs, two lower tabs, and at least two inner member snap features;
wherein each upper tab of the inner member is insertable into a respective upper channel of the outer member and each lower tab of the inner member is insertable into a respective lower channel of the outer member so that the inner member is at least initially out of position with respect to the outer member at the living hinge thereof, and
wherein the inner member is bendable at the living hinge thereof so as to bend into position with respect to the outer member and to engage corresponding snap features of the inner and outer members in response to a force applied to the inner member proximate to the living hinge thereof to form the grille badge to be mounted to a grill of the vehicle.

\* \* \* \* \*